United States Patent
Ito et al.

(10) Patent No.: US 8,160,772 B2
(45) Date of Patent: Apr. 17, 2012

(54) DRIVE CONTROL APPARATUS, DRIVE CONTROL METHOD, DRIVE CONTROL PROGRAM, AND RECORDING MEDIUM

(75) Inventors: Kohei Ito, Saitama (JP); Ryujiro Fujita, Saitama (JP)

(73) Assignee: Pioneer Corporation, Tokyo (JP)

( * ) Notice: Subject to any disclaimer, the term of this patent is extended or adjusted under 35 U.S.C. 154(b) by 441 days.

(21) Appl. No.: 12/442,793

(22) PCT Filed: Sep. 28, 2006

(86) PCT No.: PCT/JP2006/319328
§ 371 (c)(1),
(2), (4) Date: Apr. 21, 2009

(87) PCT Pub. No.: WO2008/038369
PCT Pub. Date: Apr. 3, 2008

(65) Prior Publication Data
US 2010/0094502 A1    Apr. 15, 2010

(51) Int. Cl.
*B60Q 1/00*    (2006.01)
*B60R 21/00*    (2006.01)

(52) U.S. Cl. .......... 701/36; 180/271; 340/435; 340/438; 701/301

(58) Field of Classification Search .......... 180/271, 180/272, 274, 279, 282–284; 280/734, 735; 340/901–905, 435–438, 440, 441, 449, 500, 340/501, 540, 669, 670, 6.1; 700/11, 12, 700/17, 83, 258, 259; 701/36, 45, 207, 300, 701/301, 408; 702/141, 142
See application file for complete search history.

(56) References Cited

U.S. PATENT DOCUMENTS

| | | | | |
|---|---|---|---|---|
| 3,448,822 A * | 6/1969 | La Lone et al. | | 180/169 |
| 4,833,469 A * | 5/1989 | David | | 340/901 |
| 5,327,990 A * | 7/1994 | Busquets | | 180/271 |
| 5,357,438 A * | 10/1994 | Davidian | | 701/301 |
| 5,410,346 A * | 4/1995 | Saneyoshi et al. | | 348/116 |
| 5,457,439 A * | 10/1995 | Kuhn | | 340/435 |
| 5,465,079 A * | 11/1995 | Bouchard et al. | | 340/576 |
| 5,629,847 A * | 5/1997 | Shirakawa et al. | | 701/45 |
| 6,519,519 B1 * | 2/2003 | Stopczynski | | 701/45 |
| 6,640,174 B2 * | 10/2003 | Schondorf et al. | | 701/45 |
| 6,789,015 B2 * | 9/2004 | Tsuji et al. | | 701/301 |
| 6,873,286 B2 * | 3/2005 | Albero et al. | | 342/71 |
| 7,055,640 B2 * | 6/2006 | Cook | | 180/284 |
| 7,085,637 B2 * | 8/2006 | Breed et al. | | 701/38 |
| 7,124,027 B1 * | 10/2006 | Ernst et al. | | 701/301 |
| 7,218,213 B2 * | 5/2007 | Katagiri et al. | | 340/466 |
| 7,840,354 B2 * | 11/2010 | Knoop et al. | | 701/301 |

(Continued)

FOREIGN PATENT DOCUMENTS

JP    10-038601 A    2/1998

(Continued)

*Primary Examiner* — Ruth Ilan
*Assistant Examiner* — Laura Freedman
(74) *Attorney, Agent, or Firm* — Foley & Lardner LLP

(57) ABSTRACT

A drive control apparatus (100) uses a calculating unit (103) to calculate a danger index indicative of the possibility of occurrence of a dangerous event for a mobile body based on information of the mobile body acquired by an information acquiring unit (101). A notifying unit (104) notifies a passenger of the possibility of occurrence of a dangerous event for the mobile body. A control unit (106) controls a driving unit (102) to stop the drive if a determining unit (105) determines that the danger index is greater than a predetermined value.

8 Claims, 13 Drawing Sheets

U.S. PATENT DOCUMENTS

2008/0018739 A1 * 1/2008 Hwang et al. .................. 348/148

FOREIGN PATENT DOCUMENTS

| | | | |
|---|---|---|---|
| JP | 2000-255319 | A | 9/2000 |
| JP | 2001-099661 | A | 4/2001 |
| JP | 2001-304899 | A | 10/2001 |
| JP | 2002-331890 | A | 11/2002 |
| JP | 2004-009833 | A | 1/2004 |
| JP | 2004-093354 | A | 3/2004 |
| JP | 2004-259069 | A | 9/2004 |
| JP | 2005024507 | A * | 1/2005 |
| JP | 2005267108 | A * | 9/2005 |
| JP | 2007128430 | A * | 5/2007 |

* cited by examiner

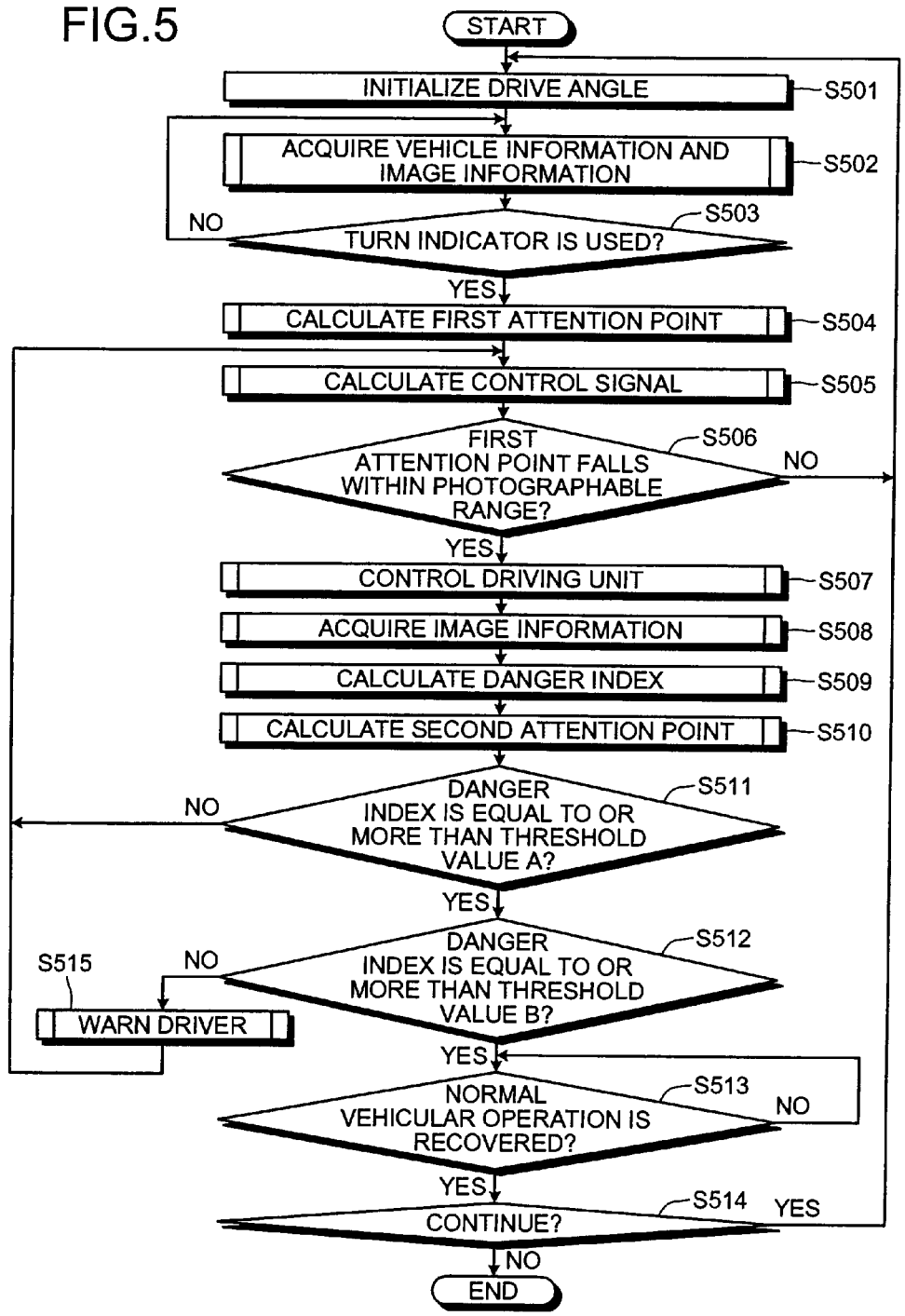

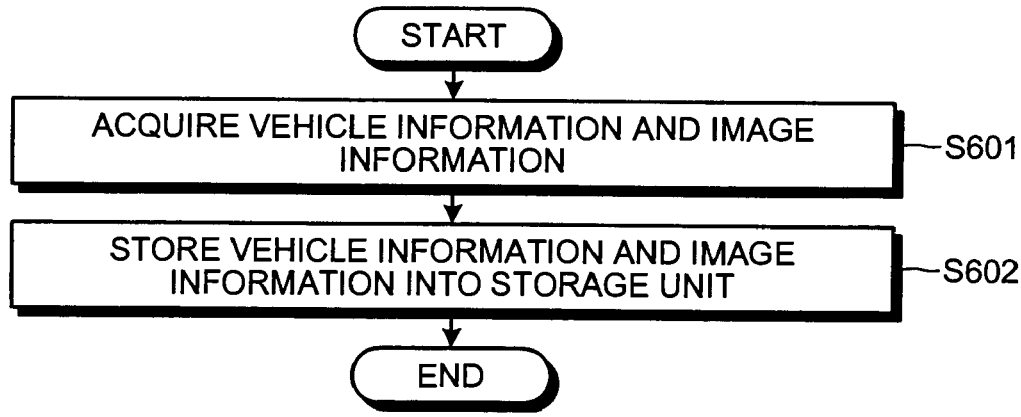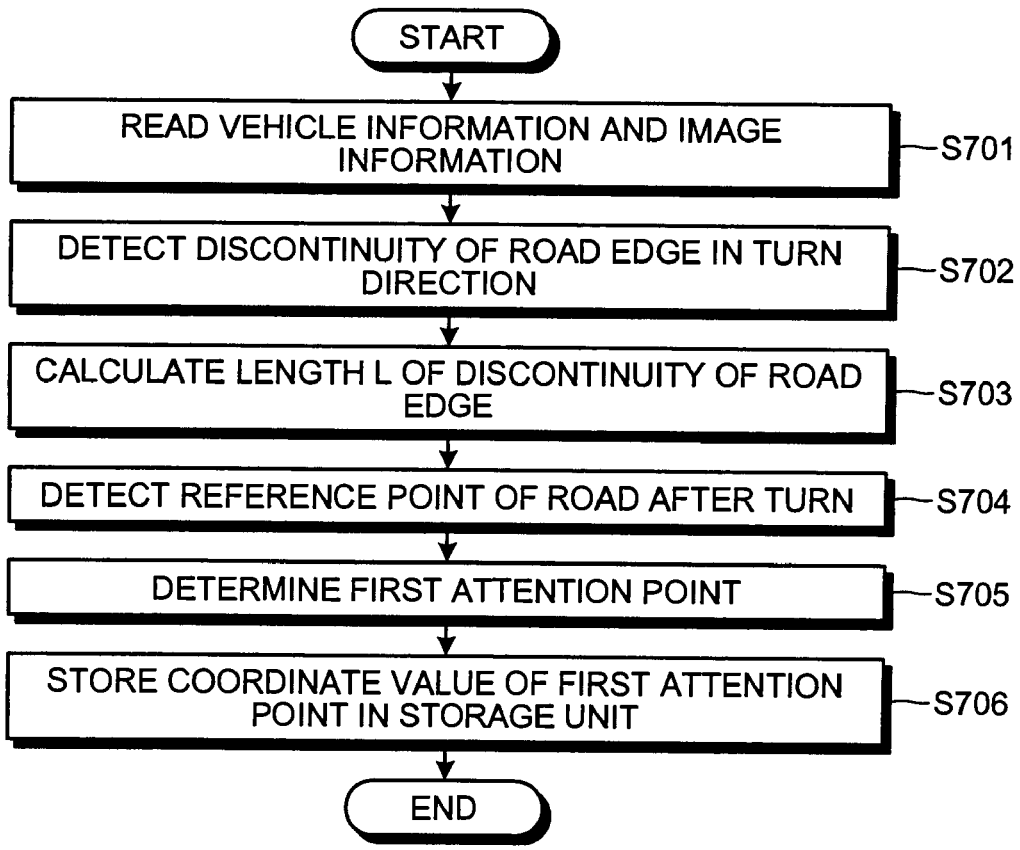

DRIVE CONTROL APPARATUS, DRIVE CONTROL METHOD, DRIVE CONTROL PROGRAM, AND RECORDING MEDIUM

TECHNICAL FIELD

The present invention relates to a drive control apparatus that controls a driving unit based on the possibility of occurrence of a dangerous event for a mobile body, a drive control method, a drive control program, and a recording medium. However, the application of the present invention is not limited to the drive control apparatus, the drive control method, the drive control program, and the recording medium.

BACKGROUND ART

Conventionally, vehicular-operation information output apparatuses exist that use a driving unit such as a robot to present information concerning car navigation to guide a vehicle to a destination as well as present information concerning the state of vehicular-operation in a familiar and understandable manner.

Among such vehicular-operation information output apparatuses, an apparatus has been proposed that detects a state of a driver using a camera and stops the movement of the driving unit or terminates the display on a display screen and sound output if the driver is watching the driving unit or the display screen, thereby preventing dangerous vehicular-operation caused by gazing at the driving unit or the display screen and achieving safe and proper navigation (see, e.g., Patent Document 1).

Patent Document 1: Japanese Patent Application Laid-Open Publication No. 2004-93354

DISCLOSURE OF INVENTION

Problem to be Solved by the Invention

However, for example, it is problematic in that if the driving unit or the display screen is within the visual field of the driver even when the driver is not looking at the driving unit or the display screen, the driver may mistake the movement and operation sound of the driving unit and the display of the display screen for an outside object that may pose a danger to the vehicle.

Means for Solving Problem

To solve the problems above and achieve an object, a drive control apparatus according to an embodiment of the invention includes a driving unit that presents information to a passenger in a mobile body; an information acquiring unit that acquires information concerning the mobile body; a calculating unit that, based on the information acquired by the information acquiring unit, calculates a danger index indicative of a possibility of occurrence of a dangerous event for the mobile body; a determining unit that determines whether the danger index calculated by the calculating unit is greater than a given value; and a control unit that controls the driving unit based on a calculation result calculated by the calculating unit, where the control unit terminates driving by the driving unit when the determining unit determines the danger index to be greater than the given value.

A drive control method according to an embodiment of the invention includes acquiring information concerning a mobile body; calculating, based on the information acquired at the acquiring, a danger index indicative of a possibility of occurrence of a dangerous event for the mobile body; determining whether the danger index calculated at the calculating is greater than a given value; and controlling, based on a calculation result calculated at the calculating, a driving unit that presents information to a passenger on the mobile body, where the controlling further includes terminating driving by the driving unit when at the determining, the danger index is determined to be greater than the given value.

A computer-readable recording medium according to an embodiment of the invention stores therein a driving control program that causes a computer to execute acquiring information concerning a mobile body; calculating, based on the information acquired at the acquiring, a danger index indicative of a possibility of occurrence of a dangerous event for the mobile body; determining whether the danger index calculated at the calculating is greater than a given value; and controlling, based on a calculation result calculated at the calculating, a driving unit that presents information to a passenger on the mobile body, where the controlling further includes terminating driving by the driving unit when at the determining, the danger index is determined to be greater than the given value.

BRIEF DESCRIPTION OF DRAWINGS

FIG. 5 is a flowchart of processing performed by the drive control apparatus according to the example;

FIG. 6 is a flowchart of processing for acquiring vehicle information and image information;

FIG. 7 is a flowchart of processing for calculating a first attention point;

Figure 1:
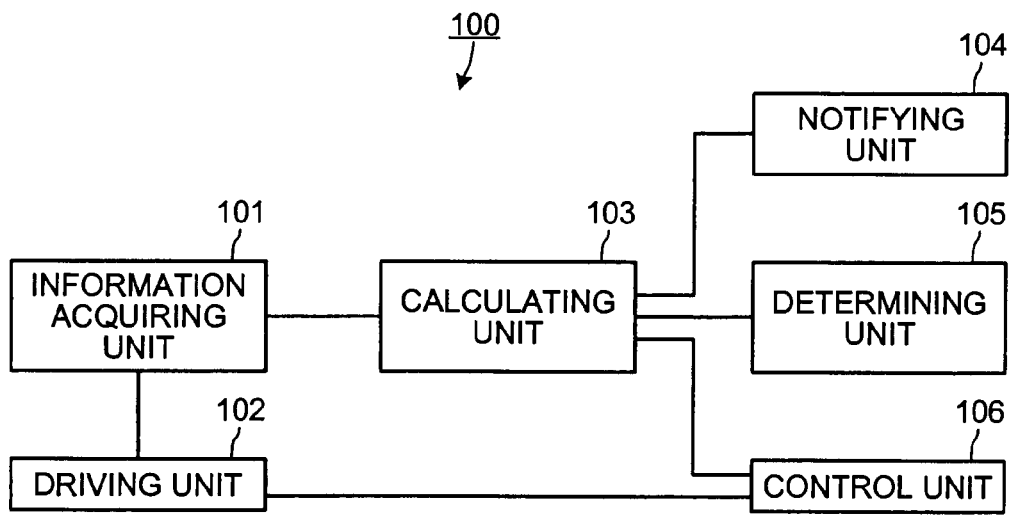
FIG. 1 is a block diagram of a functional configuration of a drive control apparatus according to an embodiment.

EXPLANATIONS OF LETTERS OR NUMERALS 100 drive control apparatus
101 information acquiring unit
102 driving unit
103 calculating unit
104 notifying unit
105 determining unit
106 control unit

BEST MODE(S) FOR CARRYING OUT THE INVENTION

Preferred embodiments of a drive control apparatus, a drive control method, a drive control program, and a recording medium according to the present invention will be described with reference to the accompanying drawings.

Embodiments (Functional Configuration of Drive Control Apparatus)

A functional configuration of a drive control apparatus 100 according to the embodiment of the present invention will be described. FIG. 1 is a block diagram of a functional configuration of a drive control apparatus according to the embodiment. As depicted in FIG. 1, the drive control apparatus 100 includes an information acquiring unit 101, a driving unit 102, a calculating unit 103, a notifying unit 104, a determining unit 105, and a control unit 106.

The information acquiring unit 101 acquires information concerning a mobile body. Specifically, for example, the information concerning a mobile body is image information concerning the surroundings of the mobile body captured by a camera mounted on the mobile body. The information concerning the mobile body may be information acquired from various sensors. The information acquired from various sensors may be, for example, speed/acceleration information of the mobile body; current position information of the mobile body; information concerning the volume and direction of sound, temperature, humidity, intensity of light, amount of smoke, components of air, contact with an arbitrary object, pressure, degree of magnetic force, etc., inside and outside of the mobile body; information concerning the distance from the mobile body to an arbitrary object; and information of heart rate, brain waves, respiration, etc., of a user.

The driving unit 102 drives sensors mounted on the mobile body. The sensors mounted on the mobile body are the various sensors above and include, for example, an image sensor (camera). The driving unit 102 may drive the information acquiring unit 101. Therefore, the information acquiring unit 101 may be integrated with or independent of the various sensors. The driving unit 102 drives the sensor or the information acquiring unit 101 mounted on the mobile body in the yaw direction and the pitch direction. The driving unit 102 may be a robot imitating a shape of a human or an animal, for example.

The calculating unit 103 calculates a danger index indicative of the possibility of occurrence of a dangerous event for the mobile body based on the information acquired by the information acquiring unit 101. A dangerous event means, for example, that the mobile body deviates from a path, that the mobile body contacts an object, or that a state of the mobile body user is different from the normal state. The danger index is a numeric value serving as a reference representative of a degree of the possibility of occurrence of such a dangerous event.

The notifying unit 104, depending on the calculation result calculated by the calculating unit 103, notifies a passenger in the mobile body of the possibility of occurrence of a dangerous event for the mobile body. The notifying unit 104 makes notification through a warning sound, audio information, or a turning on of a light, for example. If notification is given through audio information, specifically, for example, potential hazards to the mobile body are reported, such as "distance between cars is too short" or "obstacle exists on the right". The possibility of occurrence of a dangerous event for a passenger, such as "air quality is poor, open a window" or "turn down the audio volume" may be reported. Such notification of the possibility of occurrence of a dangerous event may be made through a driving of the driving unit 102.

The determining unit 105 determines whether the danger index calculated by the calculating unit 103 is a value greater than a predetermined value. The predetermined value may be set by a user or may be varied based on past history. The determining unit 105 may determine whether the danger index has returned to a value smaller than the predetermined value after it is determined that the danger index calculated by the calculating unit 103 is a value greater than the predetermined value.

The control unit 106 controls the driving unit 102 according to the calculation result calculated by the calculating unit 103. The control unit 106 stops the driving of the driving unit 102 if the determining unit 105 determines that the danger index is a value greater than the predetermined value. The control unit 106 may resume the driving of the driving unit 102 if the determining unit 105 determines that the danger index has returned to a value smaller than the predetermined value.

(Drive Control Processing by Drive Control Apparatus)

Figure 2:
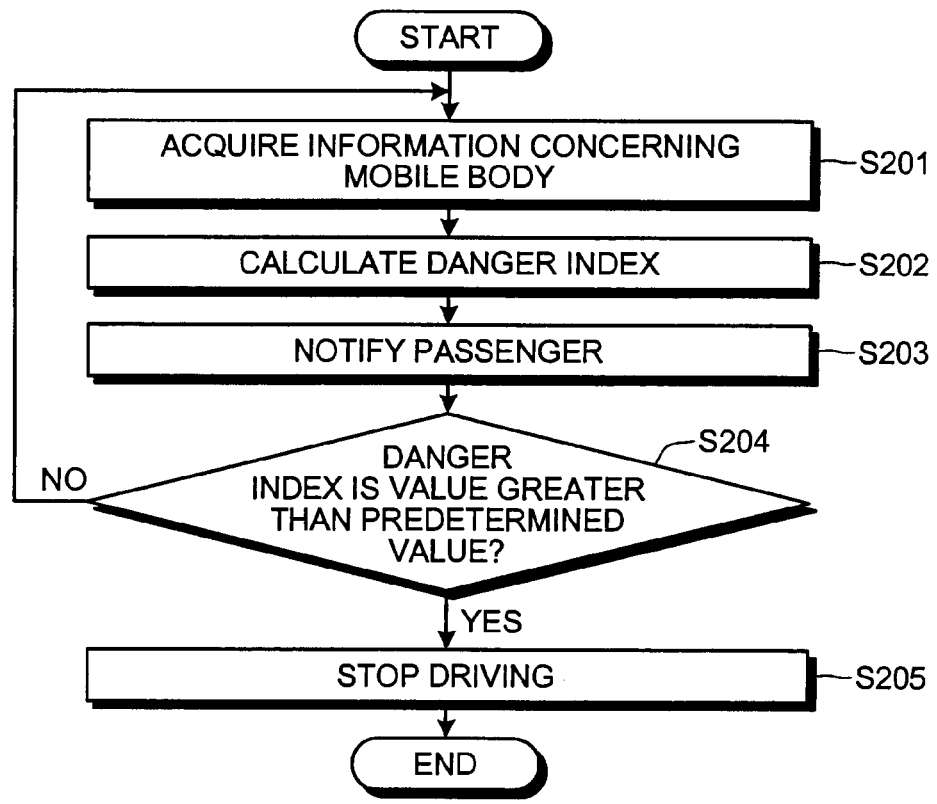
FIG. 2 is a flowchart of drive control processing by the drive control apparatus according to the embodiment.

Drive control processing by the drive control apparatus 100 will be described. FIG. 2 is a flowchart of drive control processing by the drive control apparatus according to the embodiment. As depicted in the flowchart of FIG. 2, the information acquiring unit 101 acquires information concerning the mobile body (step S201). The calculating unit 103 calculates a danger index indicative of the possibility of occurrence of a dangerous event for the mobile body based on the information concerning the mobile body acquired at step S201 (step S202). The notifying unit 104 notifies a passenger of the possibility of occurrence of a dangerous event for the mobile body (step S203).

The determining unit 105 determines whether the danger index calculated at step S202 is a value greater than a predetermined value (step S204) and if the danger index is a value greater than a predetermined value (step S204: YES), the control unit 106 controls the driving unit 102 to stop the driving (step S205), and a series of the processing ends. On the other hand, if the danger index is not a value greater than a predetermined value (step S204: NO), the processing returns to step S201, and subsequent processes are repeated.

Although the passenger is notified at step S203 in the flowchart of FIG. 2, configuration is not limited hereto. Specifically, for example, the processing may go to step S204 without notifying the passenger. Alternatively, it may be determined whether the danger index is within a predetermined range having the predetermined value of step S205 as the upper limit and if the danger index is within the predetermined range, the passenger may be notified.

Although the driving of the driving unit 102 is stopped at step S205, configuration is not limited hereto. Specifically, for example, the driving may be limited without stopping the driving of the driving unit 102. The driving is limited in such a way that the drive range of the driving unit 102 is narrowed or such that only the blinking of a light or output of sound is performed while the driving unit 102 is stopped.

As described above, according to the drive control apparatus 100 of the embodiment, the calculating unit 103 calculates a danger index indicative of the possibility of occurrence of a dangerous event for the mobile body based on the information concerning the mobile body acquired by the information acquiring unit 101, and the control unit 106 may control the driving unit 102 that drives a sensor mounted on the mobile body according to the calculation result calculated. Therefore, the drive control apparatus 100 can control the driving unit 102 if it is determined that a dangerous event will occur for the mobile body even when a user does not gaze at the driving unit 102, for example. This enables the driving unit 102 to be controlled and prevented from interrupting the judgment of the user with respect to vehicular operation during dangerous circumstances.

According to the drive control apparatus 100 of the embodiment, the passenger of the mobile body may be notified of the possibility of occurrence of a dangerous event for the mobile body according to the calculation result calculated by the calculating unit 103. Therefore, the drive control apparatus 100 may give a warning of dangerous vehicular operation circumstances to a driver if the danger index is within a predetermined range. This enables a user to know that the vehicular operation circumstances are dangerous and to avoid a dangerous event such as an accident.

According to the drive control apparatus 100 of the embodiment, the control unit 106 can stop the driving of the driving unit 102 if the determining unit 105 determines that the danger index is a value greater than the predetermined value. Therefore, the drive control apparatus 100 may stop the driving unit 102 within the visual field of the driver under dangerous circumstances to prevent the driving unit 102 from being mistaken for an object outside the vehicle (such as a person or an oncoming vehicle). This enables a user to concentrate on operation of the vehicle since no distractive motion exists within the visual field.

According to the drive control apparatus 100 of the embodiment, the driving unit 102 can drive the information acquiring unit 101. Therefore, a wide range of information can be acquired by driving the information acquiring unit 101 by the driving unit 102. This enables a user to extensively detect the possibility of occurrence of a dangerous event.

According to the drive control apparatus 100 of the embodiment, the information acquiring unit 101 may acquire image information concerning the surroundings of the mobile body. Therefore, an object with a higher danger index for the mobile body may be identified from changes in the acquired image information. This enables a user to avoid a dangerous event such as an accident.

According to the drive control apparatus 100 of the embodiment, the driving of the driving unit 102 may be resumed if the determining unit 105 determines that the danger index has returned to a value smaller than the predetermined value. Therefore, the driving unit 102 can be driven during normal vehicular operation, enabling a user to resume the movement of a robot, etc., mounted on the vehicle after a dangerous event has been avoided even if the movement has been stopped.

According to the drive control apparatus 100 of the embodiment, the driving unit 102 can drive a sensor mounted on the mobile body in the yaw direction and the pitch direction. Therefore, the drive control apparatus 100 can extensively detect the information concerning the mobile body. This enables a user to extensively detect the possibility of occurrence of a dangerous event.

Example

An example of the present invention will be described. This example describes a case of implementing the drive control apparatus of the present invention with a navigation apparatus mounted on mobile bodies such as vehicles (including four-wheel vehicles and two-wheel vehicles), for example.

(Hardware Configuration of Navigation Apparatus)

Figure 3:
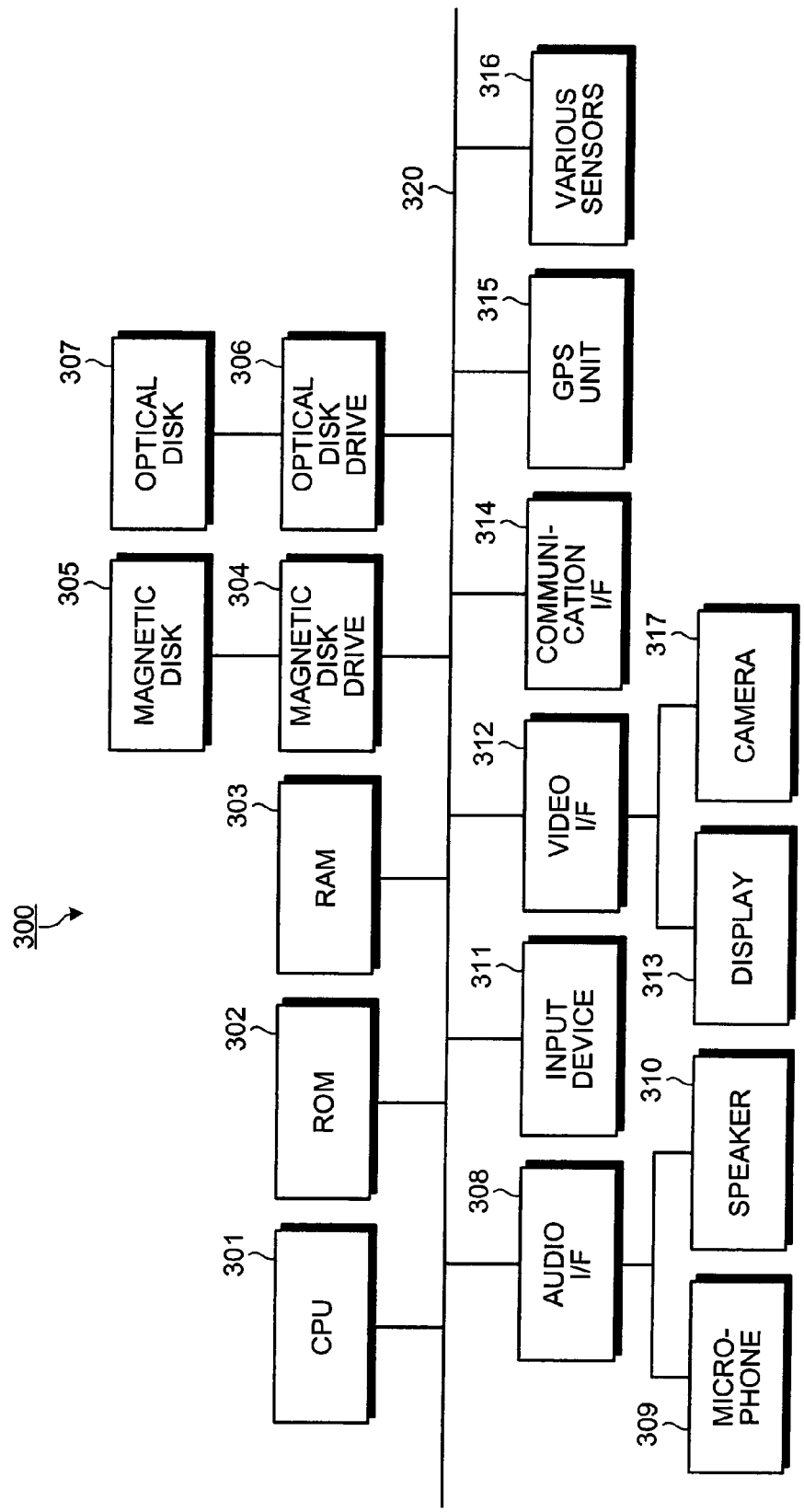
FIG. 3 is a block diagram of a hardware configuration of a navigation apparatus according to an example.

A hardware configuration of a navigation apparatus 300 according to the example will be described. FIG. 3 is a block diagram of a hardware configuration of the navigation apparatus according to the example. As depicted in FIG. 3, the navigation apparatus 300 includes a CPU 301, a ROM 302, a RAM 303, a magnetic disk drive 304, a magnetic disk 305, an optical disk drive 306, an optical disk 307, an audio I/F (interface) 308, a microphone 309, a speaker 310, an input display 311, a video I/F 312, a display 313, a communication I/F 314, a GPS unit 315, various sensors 316, and a camera 317, respectively connected through a bus 320.

The CPU 301 is responsible for the overall control of the navigation apparatus 300. The ROM 302 records programs such as a boot program and a data update program. The RAM 303 is used as a work area of the CPU 301. The CPU 301 executes various programs recorded on the ROM 302 to generally control the navigation apparatus 300, using the RAM 303 as a work area.

The magnetic disk drive 304 controls the reading/writing of data with respect to the magnetic disk 305 under the control of the CPU 301. The magnetic disk 305 records the data written under the control of the magnetic disk drive 304. The magnetic disk 305 may be HD (hard disk) or FD (flexible disk), for example.

The optical disk drive 306 controls the reading/writing of data with respect to the optical disk 307 under the control of the CPU 301. The optical disk 307 is a removable recording medium having data read out under the control of the optical disk drive 306. A writable recording medium may be utilized for the optical disk 307. The removable recording medium may be a medium other than the optical disk 307, such as an MO and a memory card.

Exemplary information recorded on the magnetic disk 305 includes map data and function data. The map information includes background data representing features such as buildings, rivers, and ground surfaces, and road shape data indicative of road shapes, and is made up of data files sorted by districts.

The road shape data also include traffic condition data. The traffic condition data include, for example, information indicative of the presence of traffic lights, crosswalks, and presence of entrances/exits and junctions of expressways for the nodes, and lengths (distances) of links, road widths, directions of travel, road types (such as expressway, toll road, general road), etc., for the links.

The function data are three-dimensional data indicative of shapes of facilities on the map, text data indicative of explanations of the facilities, and various data other than the map data. The map data and the function data are recorded in a state of blocks sorted by district or function. Specifically, for example, the map data are recorded in blocks sortable by district such that respective blocks represent predetermined districts on the map displayed on a display screen. For example, the function data are recorded in multiple blocks sortable by function such that each block implements one function.

The function data are data including data implementing functions of program data that implement route search, calculation of time required, route guide, etc., in addition to the three-dimensional data and the text data described above. The map data and the function data are sorted into data files according to district and function, respectively.

The audio I/F 308 is connected to the microphone 309 for audio input and the speaker 310 for audio output. Sounds received by the microphone 309 are A/D-converted within the audio I/F 308. The microphone 309 is disposed near a sun visor of the vehicle and one or more of the microphones 309 may be disposed. The speaker 310 outputs sounds of predetermined audio signals subjected to D/A conversion in the audio I/F 308. The sounds input from the microphone 309 may be recorded as audio data on the magnetic disk 305 or the optical disk 307.

The input device 311 includes a remote controller having keys for entering characters, numeric values, and various instructions; a keyboard; a touch panel; etc. The input device 311 may be implemented in single form such as a remote controller, a keyboard, and a touch panel, or may be implemented in multiple forms.

The video I/F 312 is connected to the display 313. Specifically, the video I/F 312 is made up of, for example, a graphic controller that generally controls the display 313, a buffer memory such as VRAM (Video RAM) that temporarily records immediately displayable image information, and a control IC that controls the display 313 based on image data output from a graphic controller.

The display 313 displays icons, cursors, menus, windows, or various data such as characters and images. The display 313 draws the above map data two-dimensionally or three-dimensionally. The map data displayed on the display 313 can be superimposed with a mark, etc., representative of the current position of the vehicle equipped with the navigation apparatus 300. The current position of the vehicle is calculated by the CPU 301.

For example, a CRT, a TFT liquid crystal display, a plasma display, etc., may be employed as the display 313. The display 313 is disposed near the dashboard of the vehicle. The display 312 may be disposed in plural in the vehicle in such a way that the displays are disposed in the vicinity of the backseat of the vehicle as well as near the dashboard of the vehicle.

The communication I/F 314 is wirelessly connected to a network and functions as an interface between the navigation apparatus 300 and the CPU 301. The communication I/F 314 is wirelessly connected to a communication network such as the internet and also functions as an interface between this communication network and the CPU 301.

The communication network includes LAN, WAN, public line network, portable telephone network, etc. Specifically, the communication I/F 314 is made up of, for example, an FM tuner, VICS (Vehicle Information and Communication System)/beacon receiver, a radio navigation device, and other navigation devices and acquires road traffic information, such as road congestion and traffic regulations, distributed from VICS centers. VICS is a registered trademark.

The GPS unit 315 receives signals from GPS satellites and outputs information indicative of the current position of the vehicle. The information output from the GPS unit 315 is used along with values output from the various sensors 316 (described hereinafter) when the CPU 301 calculates the current position of the vehicle. The information indicative of the current position is information specifying one point on map information, for example, latitude/longitude and altitude.

The various sensors 316 are those outputting information for determining the position and behavior of the vehicle, such as a vehicular speed sensor, an acceleration sensor, and an angular-speed sensor. The values output from the various sensors 316 are used by the CPU 301 for calculating the current position of the vehicle and calculating changes in velocity and direction. The various sensors 316 output information for determining a state inside the vehicle and information for determining a state of the driver. Specifically, the information for determining a state inside the vehicle is information such as temperature, humidity, amount of smoke, and components of air inside the vehicle. Specifically, the information for determining a state of the driver is information such as heart rate, brain waves, and respiration of the driver.

The camera 317 captures images inside or outside the vehicle. The images may be still images or moving images and, for example, the camera 317 captures images of behaviors of a passenger inside the vehicle and outputs the captured images to a recording medium such as the magnetic disk 305 and the optical disk 307 through the video I/F 312. The camera 317 captures images of conditions outside the vehicle and outputs the captured images to the recording medium such as the magnetic disk 305 and the optical disk 307 through the video I/F 312. The camera 317 has an infrared camera function, and distributions of surface temperatures of objects present inside the vehicle may relatively be compared based on the image information captured with the use of the infrared camera function. The images output to the recording medium are overwritten and saved.

The functions of the image acquiring unit 101, the dividing unit 102, the calculating unit 103, the notifying unit 104, the determining unit 105, and the control unit 106 included in the drive control apparatus 100 depicted in FIG. 1 are implemented by the CPU 301 executing predetermined programs to control the units of the navigation apparatus 300 with the use of programs and data recorded on the ROM 302, the RAM 303, the magnetic disk 305, the optical disk 307, etc., of the navigation apparatus 300 depicted in FIG. 3.

The navigation apparatus 300 of the example can execute the drive control program recorded on the ROM 302 serving as the recording medium in the navigation apparatus 300 to implement the functions of the drive control apparatus 100 depicted in FIG. 1 in the drive control processing procedures depicted in FIG. 2.

(Functional Configuration of Drive Control Apparatus)

Figure 4:
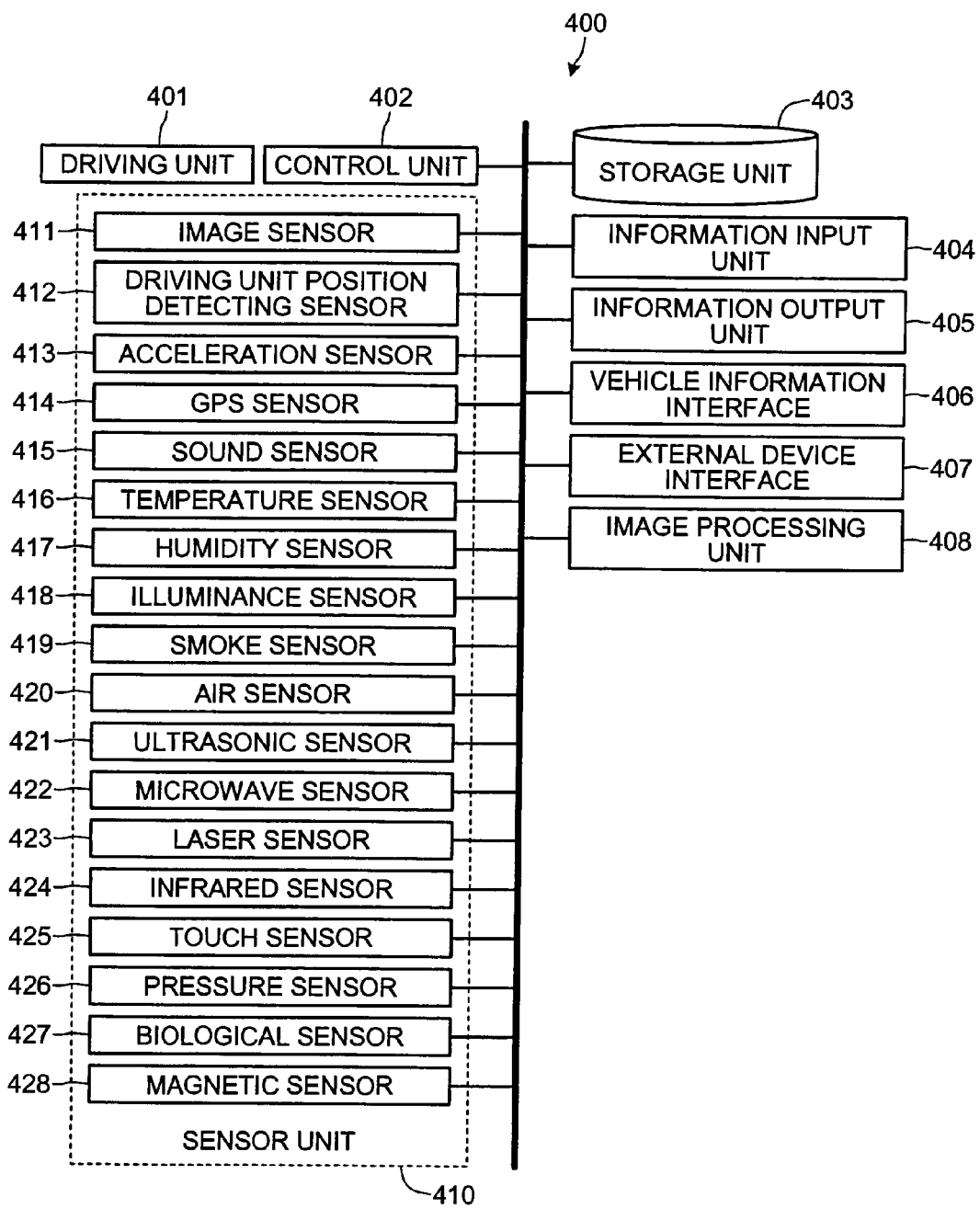
FIG. 4 is a block diagram of a functional configuration of a drive control apparatus according to an example.

The functional configuration of the drive control apparatus according to the example will be described with reference to FIG. 4. FIG. 4 is a block diagram of a functional configuration of the drive control apparatus according to the example. As depicted in FIG. 4, a drive control apparatus 400 includes a driving unit 401, a control unit 402, a storage unit 403, an information input unit 404, an information output unit 405, a vehicle information I/F 406, an external device I/F 407, an image processing unit 408, and a sensor unit 410. The drive control apparatus 400 may be integrated with or independent of the navigation apparatus 300. Some functions may be configured to be shared.

The driving unit 401 is controlled by the controlling unit 402 for driving in the yaw direction and the pitch direction and enables driving with multiple degrees of freedom such as roll directions associated with these directions. The driving unit 401 may be equipped with one or more of the sensors of the sensor unit 410 described hereinafter. The driving unit 401 may be disposed at a position within the visual field of the driver of the vehicle and enabling acquisition of information of the surroundings of the vehicle. For example, if the driving unit 401 is equipped with an image sensor unit 411, the driving unit 401 equipped with the image sensor unit 411 is disposed on the upper side of the dashboard or near a rearview mirror.

The driving unit 401 may be a robot in a shape of a human or an animal. In this case, the driving unit 401 may include all or some of constituent units described hereinafter. Specifically, for example, the information output unit 405 is included to present information to a user by displaying an image or outputting sounds. The driving unit 401 moves to present information to a user. For example, the driving unit 401 raises an arm or shakes the head to present information to a user.

If the driving unit 401 is equipped with a camera serving as the image sensor unit 411, the driving unit may change the shooting direction of the camera. Specifically, for example, the view angles of a camera are 40 degrees horizontally and 30 degrees vertically in the case of normal digital cameras or movie cameras. Therefore, the camera can capture images in a wide range by varying the visual field direction by the driving unit 401.

The control unit 402 controls the driving unit 401. Specifically, the control unit 402 outputs control signals for controlling the driving unit 401 to the driving unit 401. Specifically, for example, the control unit 402 outputs a control signal for rotating the driving unit 401 in the yaw direction or the pitch direction and control signals for controlling the turning on/off of various sensors to the driving unit 401. If the driving unit 401 is a robot in a shape of a human or an animal, the control unit 402 may concurrently control multiple outputs such as an output of light, audio, and motion.

The storage unit 403 stores various types of information. Information stored in the storage unit 403 includes map information, for example. The map information includes road network data consisting of nodes and links and image data drawn with the use of features for facilities, roads, and other land shapes (mountains, rivers, and lands). The map data may include text information, information of names and addresses of facilities, images of roads and facilities.

The map information also includes types and positions of road signs and billboards, positions of traffic signals, ranges of school zones, etc. The storage unit 403 stores the vehicle information, the image information, the coordinate values of points, the danger index, etc., acquired by the information input unit 404, the vehicle information I/F 406, the external device I/F 407, and the sensor unit 410.

The information input unit 404 inputs various types of information. For example, a touch sensor unit 425, a sound sensor unit 415, or the image sensor unit 411 may implement the function thereof and specifically includes a touch panel, a remote controller, a mouse, a touch sensor, a microphone, a camera, etc. The information output unit 405 outputs various types of information. Specifically, for example, the information output unit 405 includes a display screen that displays images, an output device that outputs sounds, etc.

The vehicle information I/F 406 acquires vehicle information concerning vehicular speed and the operation of the vehicle. Specifically, for example, the vehicle information is information concerning operations such as turn indicators, hazard lamps, steering angles, lights, and wipers and information concerning vehicular speed from an acceleration sensor unit 413, etc. The vehicle information I/F 406 may acquire information from inside the vehicle. Specifically, for example, the vehicle information I/F 406 may acquire information concerning the behavior of the driver or conditions such as temperature, humidity, components of air, etc., inside the vehicle.

The external device I/F 407 functions as an interface with external devices and is connected with various external devices. For example, the external device I/F 407 identifies the position of the vehicle with information from GPS satellites. The external device I/F 407 refers to the map information in a map information database, etc. The external device I/F 407 connects to the navigation apparatus 300 to set a route to a destination. The function of the external device I/F 407 may be implemented by a GPS sensor unit 414 and the storage unit 403.

The image processing unit 408 uses the information stored in the storage unit 403 and the image information acquired from the image sensor unit 411 to process images. Specifically, for example, the image processing unit 408 recognizes directions and speeds of moving objects, road signs, and billboards. The sensor unit 410 includes various sensor units. Specifically, for example, the sensor unit 410 includes a sensor that acquires information about a state of the vehicle, a sensor that acquires information about a state of the driver, etc.

The image sensor unit 411 acquires image information. Specifically, for example, images inside or outside the vehicle are captured by a CCD camera, etc., to acquire the image information. A driving-unit position detecting unit 412 detects a position or rotation of the driving unit 401. Specifically, the drive angles in the yaw direction and the pitch direction of the driving unit 401 are detected.

The acceleration sensor unit 413 detects acceleration of the vehicle with a gyroscope, etc. The acceleration of the vehicle may be the acceleration in the longitudinal direction for detecting changes in the vehicle speed or may be the acceleration in the lateral direction for detecting the vibrations of the vehicle. The GPS sensor unit 414 detects the current position of the vehicle based on electric waves from the GPS satellites. The sound sensor unit 415 acquires the loudness of sound and the direction of emission of sound inside or outside the vehicle through a microphone, etc.

A temperature sensor unit 416 measures temperature inside or outside the vehicle. A humidity sensor unit 417 measures humidity inside or outside the vehicle. An illuminance sensor unit 418 measures the intensity of light inside or outside the vehicle. Specifically, for example, the sensor detects whether the vehicle has entered a tunnel and whether the sun is shining. The illuminance sensor unit 418 may detect an amount of ultraviolet light in sunlight. A smoke sensor unit 419 detects smoke inside or outside the vehicle. Specifically, for example, cigarette smoke is detected. An air sensor unit 420 measures components of the air. Specifically, for example, the carbon monoxide concentration or the impurity concentration inside the vehicle is measured.

An ultrasonic sensor unit 421 measures the distance to an object in proximity of the vehicle. Specifically, the ultrasonic sensor unit 421 measures the time until ultrasonic waves emitted from the ultrasonic sensor unit 421 mounted on the vehicle return to the vehicle to measure the distance from the vehicle to the object to be measured. The microwave sensor unit 422 measures a distance to an object in proximity of the vehicle. Specifically, microwaves are used to measure the distance from the vehicle to the object. A laser sensor unit 423 measures the distance to an object in proximity of the vehicle. Specifically, a laser beam is used to measure a distance from the vehicle to the object.

An infrared sensor unit 424 uses infrared light to acquire image information. The touch sensor unit 425 determines whether an arbitrary object contacts an objective part inside or outside the vehicle. A pressure sensor unit 426 measures air pressure inside the vehicle and forces applied to the sensors.

A biological sensor 427 acquires information such as heart rate, brain waves, respiration, etc., of a user. The magnetic sensor unit 428 measures a magnetic force.

(Schematic of Processing by Drive Control Apparatus)

A schematic of processing by the drive control apparatus 400 will be described. FIG. 5 is a flowchart of processing performed by the drive control apparatus according to the example. As depicted in the flowchart of FIG. 5, the drive angle of the driving unit 401 is initialized (step S501). Specifically, for example, the angles of the driving unit 401 are set to 0 degrees in the yaw direction and the pitch direction.

The vehicle information and the image information are acquired (step S502). It is determined whether a turn indicator is used based on the vehicle information acquired at step S502 (step S503) and if a turn indicator is used (step S503: YES), a first attention point is calculated (step S504). On the other hand, if a turn indicator is not used (step S503: NO), the processing returns to step S502, and subsequent processes are repeated. The first attention point is an attention point for time T. The attention point is a reference point on a road when calculating a danger index of the vehicle.

The first attention point calculated at step S504 is used to calculate a control signal to the driving unit 401 (step S505). The control signal is an electric signal that controls the driving unit 401. When the control signal calculated at step S505 is input to the driving unit 401, it is determined whether the first attention point calculated at step S504 falls within a photographable range (step S506). At step S506, the photographable range is a range of the view angles of a camera.

If the first attention point falls within the photographable range (step S506: YES), the driving unit 401 is controlled by the control signal calculated at step S505 (step S507). On the other hand, if the first attention point does not fall within the photographable range (step S506: NO), the processing returns to step S501, and subsequent processes are repeated.

Image information is acquired by the camera mounted on the driving unit 401 controlled at step S507 (step S508) and the danger index is calculated based on this image information and the vehicle information acquired at step S502 (step S509); and a second attention point is calculated (step S510). The second attention point is an attention point for time (T+ΔT).

It is determined whether the danger index calculated at step S509 is at least equal to a threshold value A (step S511), and if the danger index is equal to or more than the threshold value A (step S511: YES), it is further determined whether the danger index is at least equal to a threshold value B (step S512). It is assumed that the threshold value A<the threshold value B. If the danger index is equal to or more than the threshold value B (step S512: YES), recovery to normal vehicular operation is waited for (step S513: NO), and if recovery to normal vehicular operation is achieved (step S513: YES), it is determined whether the control of the driving unit 401 is to be continued (step S514). If the control is not to be continued at step S514 (step S514: NO), the series of processing ends.

On the other hand, if the danger index is less than the threshold value A at step S511 (step S511: NO), the processing returns to step S505, and subsequent processes are repeated. If the danger index is less than the threshold value B at step S512 (step S512: NO), the driver is warned (step S515) and the processing returns to step S505, and subsequent processes are repeated.

The processing by the drive control apparatus 400 at each operation described in FIG. 5 will be described in detail with reference to FIGS. 6 to 21. This example uses a camera having functional performances of the lens field angles (W, H)=(40°, 30°) and the resolutions (W, H)=(640, 480). W indicates a range in a direction of width and H indicates a range in a direction of height. It is assumed that no uneven part exists on the road on which the vehicle is traveling. The range of the drive angle of the driving unit 401 corresponds to a range from −90° to +90° in the yaw direction, assuming that the angle of the straight forward direction is 0° and that the rightward direction is the positive direction, and is a range from −45° to +45° in the pitch direction, assuming that the angle of the direction parallel to the road and that the downward direction is the positive direction.

(Initializing Drive Angle Processing)

The processing for initializing the drive angle at step S501 of FIG. 5 will be described in detail. The initialization of the drive angle is performed by the control unit 402 setting the angles of the driving unit 401 to 0° in the yaw direction and 0° in the pitch direction.

(Processing for Acquiring Vehicle Information and Image Information)

The processing for acquiring the vehicle information and the image information at step S502 of FIG. 5 will be described in detail with reference to FIG. 6. FIG. 6 is a flowchart of the processing for acquiring the vehicle information and the image information. As depicted in the flowchart of FIG. 6, the vehicle information and the image information are acquired (step S601).

The vehicle information is information acquired by the vehicle information I/F 406 and specifically is information concerning the turn indicator and information concerning the vehicle speed. The image information is information acquired by the image sensor unit 411 and specifically is information concerning images of the surroundings of the vehicle captured by a camera, etc. The vehicle information and the image information acquired at step S601 are stored in the storage unit 403 (step S602), and a series of the processing ends.

(Processing for Calculating the First Attention Point)

The processing for calculating the first attention point at step S504 of FIG. 5 will be described in detail with reference to FIGS. 7 to 10. FIG. 7 is a flowchart of the processing for calculating the first attention point. As depicted in the flowchart of FIG. 7, the vehicle information and the image information stored in the storage unit 403 at step S602 of FIG. 6 are read out (step S701). At step S701, the image information is assumed to be captured by a camera disposed at a height of one meter from the road with an angle of 0° in the pitch direction.

Figure 8:
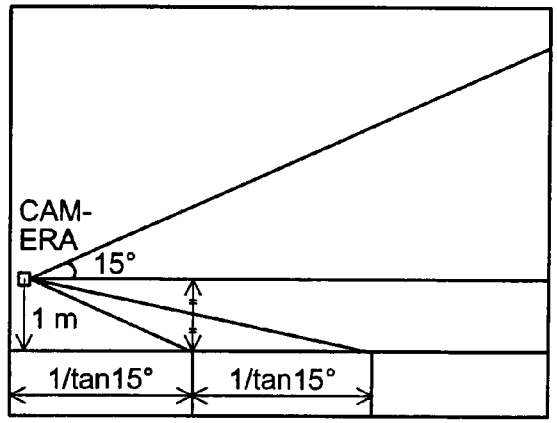
FIG. 8 is an explanatory diagram of a vertical distance of a point on a road in a captured image.

Calculation of an actual distance between a point on the road and the camera in the captured image will be described for a case in which a camera is disposed at a height of one meter from the road. FIG. 8 is an explanatory diagram of a vertical distance of a point on the road in the captured image. As depicted in FIG. 8, if a camera with a lens field angle of 30° in the direction of height is disposed at a height of one meter from the road, a distance from the camera to the lowest point of the road in the image is calculated from 1×(1/tan 15°. A distance from the camera to the center point of the road in the lower-half image acquired by vertically dividing the image is calculated from 1×(1/tan 15°.

Figure 9:
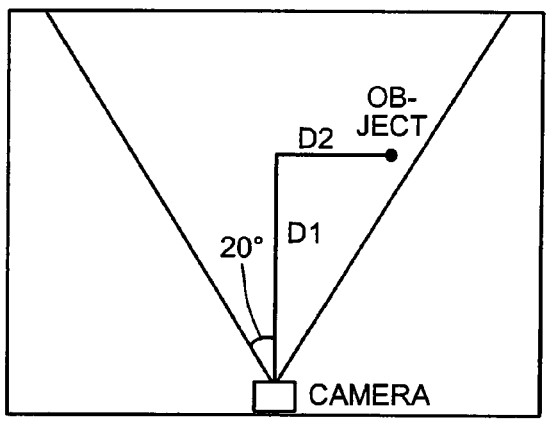
FIG. 9 is an explanatory diagram of a relation between a horizontal distance and a vertical distance from a center point of the captured image.

FIG. 9 is an explanatory diagram of a relation between a horizontal distance and a vertical distance from the center point of the captured image. As depicted in FIG. 9, assuming that the y-coordinates and the x-coordinates represent the lower direction and the rightward direction, respectively, from the image center point in the image and that a horizontal distance from a point of coordinates (x, y) to the camera is D1, since the range of the resolution of the camera is 480 in the direction of height, $D1=1\times(1/\tan 15°)\times(240/y)$ [Eq. 1].

Assuming that a vertical distance to the optical axis of the camera at a point of coordinates (x, y) is D2, since the range of the lens field view of the camera is 40° in the lateral direction and the range of the resolution is 640 in the lateral direction, D2=D1×(1/tan 20°)×(x/320) [Eq. 2].

A discontinuity of the road edge in the turn direction is detected based on the vehicle information and the image information read at step S701 (step S702). Specifically, a direction indicated by the turn indicator is determined as the turn direction from turn-indicator in the vehicle information and the discontinuity of the road edge is detected by analyzing the image information.

Figure 10:
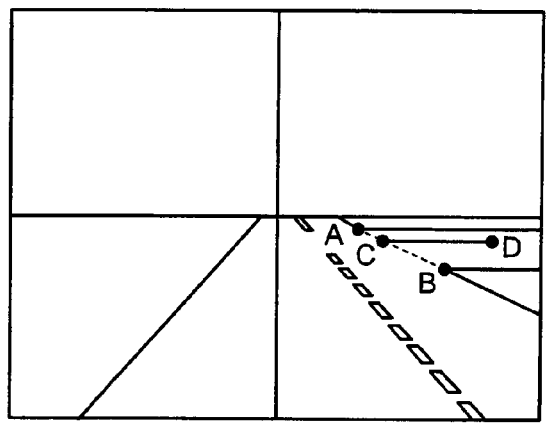
FIG. 10 is an explanatory diagram for explaining points on a road.

FIG. 10 is an explanatory diagram for explaining points on a road. FIG. 10 depicts a point of discontinuity of the road edge in the turn direction farther from the vehicle (point A), a point of discontinuity of the road edge in the turn direction closer to the vehicle (point B), a reference point of the road beyond the turn (point C), and the first attention point (point D). The points A, B, C, and D are assumed to be present on the road. Two points, i.e., the points A and B are detected for the discontinuity of the road edge at step S702.

A length L of the discontinuity of the road edge is calculated (step S703). The length L of the discontinuity of the road edge is a length between the point A and the point B detected at step S702. The reference point of the road after the turn (point C) is then detected (step S704). The point C is a point on the line between the point A and the point B where the distance between A and C is ¼ of the distance between A and B in the case of the left-hand traffic. In other words, the point C is the center point of the road on which the vehicle travels after turning onto the road according to the indication of the turn indicator.

The first attention point (point D) is determined depending on the reference point detected at step S704 (step S705). The point D is a point apart from the point C, perpendicular to the optical axis of the camera at a distance equivalent to the distance between A and B. The coordinate value of the first attention point determined at step S705 is stored in the storage unit 403 (step S706), a series of the processing ends.

The coordinate value of the point D is obtained as follows. If the coordinate value of the point A in the image is Pa=(120, 40), a distance (D1a, D2b) to the point A from the camera is obtained as (D1a, D2a)=(6/tan 15°, 2×(tan 20°/tan 15°) from [Eq. 1] and [Eq. 2]. If the coordinate value of the point B in the image is Pb=(160, 60), a distance (D1a, D2b) to the point A from the camera is obtained as (D1b, D2b)=(4/tan 15°, 2×(tan 20°/tan 15°) from [Eq. 1] and [Eq. 2].

Therefore, the distance Dab between A and B is Dab=7.5 meters from the theorem of three squares. Therefore, the coordinate value Pc of the point C in the image is Pc=(130, 45). Since the coordinate value Pd of the point D in the image is located apart from Pc at a distance Dab to the right of the traveling direction perpendicularly to the camera optical axis, the value is Pd=(253, 45).

(Processing for Calculating Control Signal)

Figure 11:
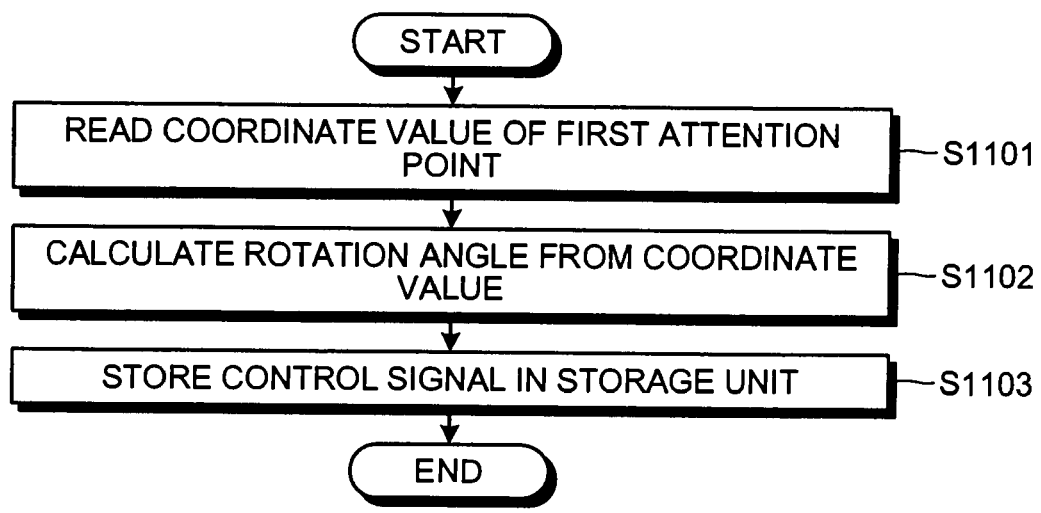
FIG. 11 is a flowchart of processing for calculating a control signal.

The processing for calculating the control signal at step S505 of FIG. 5 will be described in detail with reference to FIG. 11. FIG. 11 is a flowchart of the processing for calculating the control signal. As depicted in FIG. 11, the coordinate value of the first attention point stored in the storage unit 403 at step S706 of FIG. 7 is read out (step S1101). The rotation angles are calculated from the coordinate value of the first point read out at step S1101 (step S1102).

At step S1102, when the rotation angles are calculated, specifically, assuming that the coordinates of the point D is Pd=(x, y), a rotation angle θ in the yaw direction for overlapping the image center point with the point D is represented by θ=tan−1(tan 20(x/320)) and a rotation angle φ in the pitch direction is represented by φ=tan−1(tan 15(y/240)). Therefore, substituting the coordinate value (253, 45) of the point D stored in the storage unit 403 at step S706 of FIG. 7, θ=tan−1(tan 20(253/320))=16 and φ=tan−1(tan 15(45/240))=3 are obtained. The control signal corresponding to the rotation angles (θ, φ)=(16, 3) calculated at step S102 is stored in the storage unit 403 (step S1103), and a series of the processing ends.

(Processing for Controlling the Driving Unit)

Figure 12:
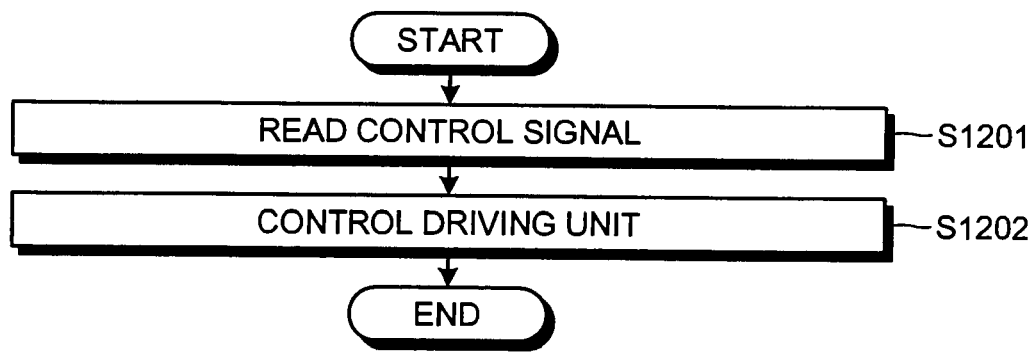
FIG. 12 is a flowchart of processing for controlling a driving unit.

The processing for controlling the driving unit at step S507 of FIG. 5 will be described in detail with reference to FIG. 12. FIG. 12 is a flowchart of the processing for controlling the driving unit. As depicted in FIG. 12, the control signal stored in the storage unit 403 at step S1103 of FIG. 11 is read out (step S1201). The driving unit 401 is controlled by the control signal read out at step S1201 (step S1202), and a series of the processing ends.

The control of the driving unit 401 is performed by rotating the camera to an angle to capture the point D described in FIGS. 7 to 10 in the image captured by the camera, for example. Specifically, when the camera is controlled and rotated by the rotation angle θ in the yaw direction and the rotation angle φ in the pitch direction using the coordinate value of the point D calculated in FIG. 11, the point D is overlapped with the center point of the image and, therefore, the point D is captured in the image.

(Processing for Acquiring Image Information)

Figure 13:
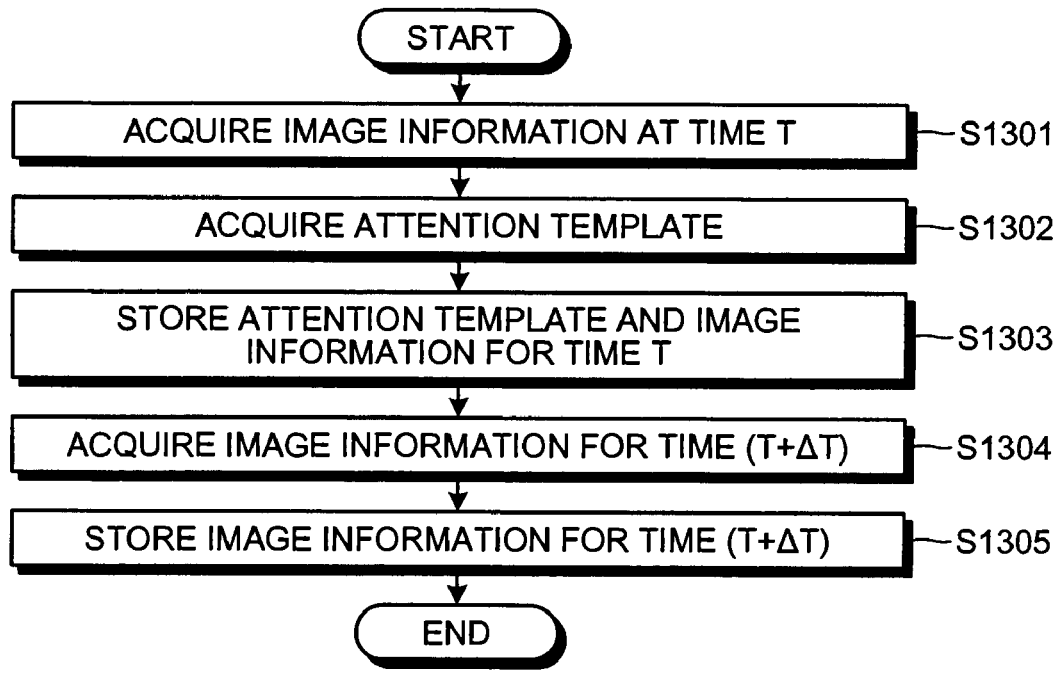
FIG. 13 is a flowchart of processing for acquiring the image information.

The processing for acquiring the image information at step S508 of FIG. 5 will be described in detail with reference to FIG. 13. FIG. 13 is a flowchart of the processing for acquiring the image information. As depicted in FIG. 13, the image information for time T is acquired by the camera controlled at step S1202 of FIG. 12 (step S1301). Therefore, the center point of the image information is overlapped with the point D.

An attention-point template is acquired that is a range of 10×10 pixels centering on the center point of the image information acquired at step S1301 (step S1302). The attention-point template acquired at step S1302 and the image information for time T are stored in the storage unit 403 (step S1303). The image information is acquired when time ΔT has elapsed after the image is acquired at step S1301, i.e., image information for time (T+ΔT) (step S1304). The image information for time (T+ΔT) is stored at the storage unit 403 (step S1305), and a series of the processing ends.

(Processing for Calculating Danger Index)

Figure 14:
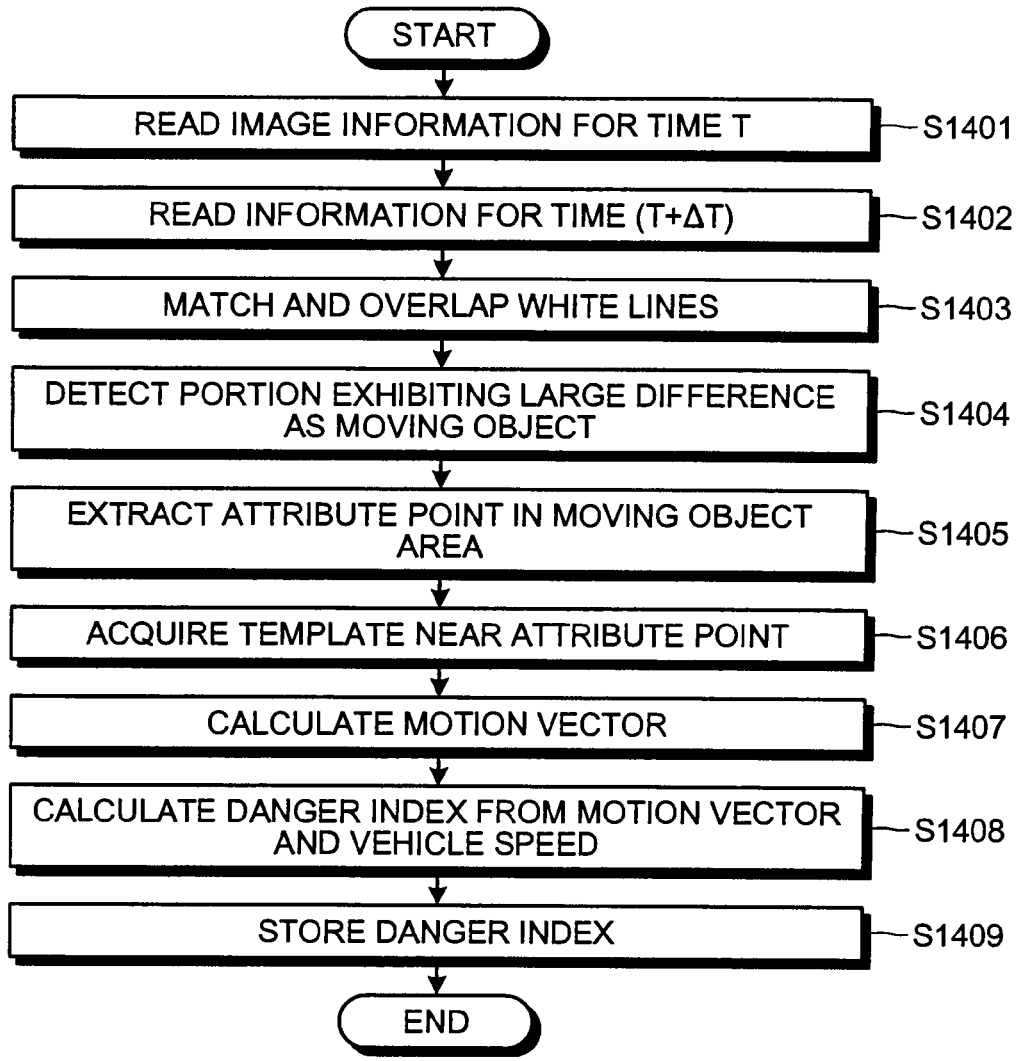
FIG. 14 is a flowchart of processing for calculating a danger index.
Figure 15:
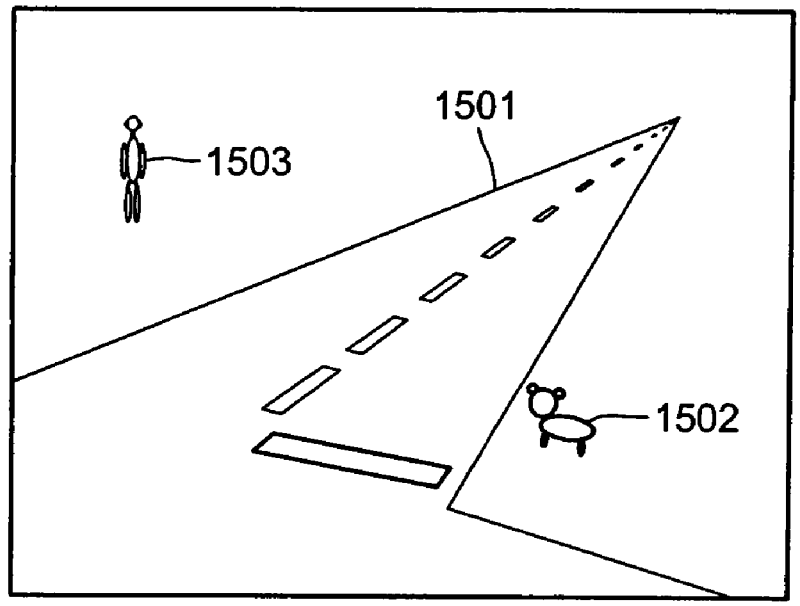
FIG. 15 is an explanatory diagram of the image information acquired at time T.
Figure 16:
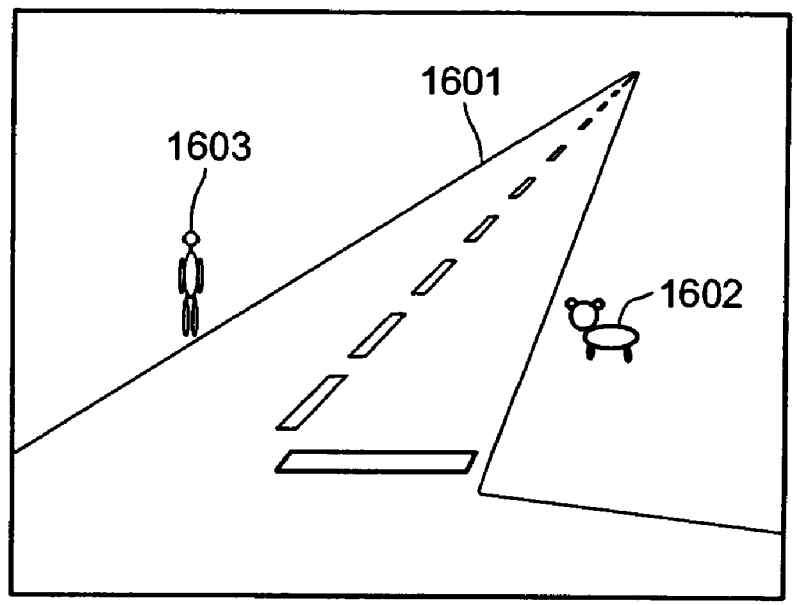
FIG. 16 is an explanatory diagram of the image information acquired at time (T+ΔT)

The processing for calculating the danger index at step S509 of FIG. 5 will be described in detail with reference to FIGS. 14 to 19. FIG. 14 is a flowchart of the processing for calculating the danger index. FIG. 15 is an explanatory diagram of the image information acquired at time T and FIG. 16 is an explanatory diagram of the image information acquired at time (T+ΔT).

As depicted in the flowchart of FIG. 14, the image information for time T is read from the storage unit 403 (step S1401). The image information for time T is the image information stored at step S1303 of FIG. 13 and, specifically, for example, the image information depicted in FIG. 15. As depicted in FIG. 15, and image of a road 1501 along which the vehicle is traveling, an animal 1502, and a person 1503 is captured. The image information for time (T+ΔT) is read from the storage unit 403 (step S1402). The image information for time (T+ΔT) is the image information stored at step S1305 of FIG. 13 and, specifically, for example, the image information depicted in FIG. 16. As depicted in FIG. 16, an image of a road 1601 along which the vehicle is traveling, an animal 1602, and a person 1603 is captured.

The image information for time T read at step S1401 is superimposed on the image for time (T+ΔT) read at step S1402 by matching white lines (step S1403). The matching of white lines is performed by overlapping white lines such as crosswalks, stop lines, white lines between traffic lanes, and white lines on the edges of the road. Specifically, for example, image information depicted in FIG. 17 is acquired.

Figure 17:
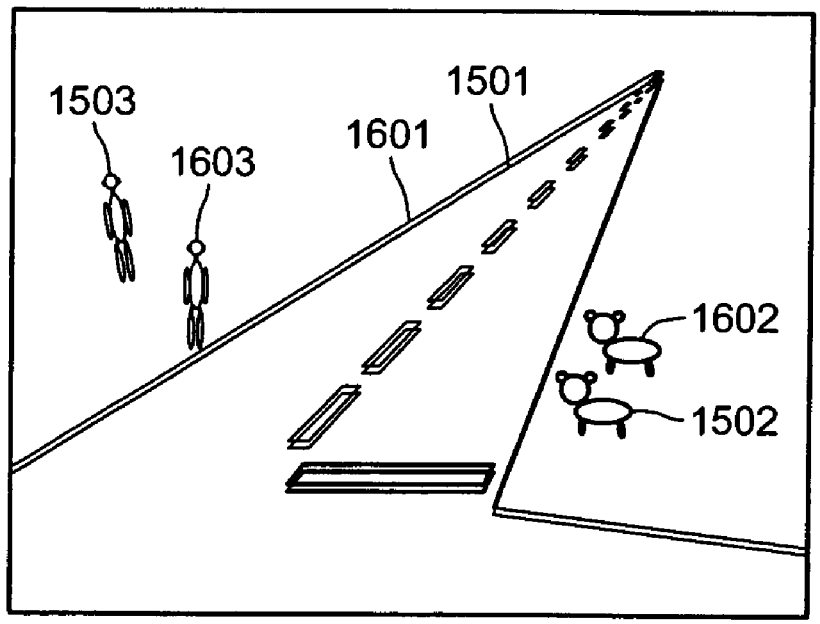
FIG. 17 is an explanatory diagram of the image information where white lines are matched and overlapped.

FIG. 17 is an explanatory diagram of the image information where white lines are matched and overlapped. As depicted in FIG. 17, the road 1501 of FIG. 15 and the road 1601 of FIG. 16 are superimposed by matching the white lines. Therefore, differences in ΔT may be represented for objects captured in the image exclusive of the road. Specifically, for example, the positions of the animal 1502 and the person 1503 at time T and the positions of the animal 1602 and the person 1603 at time (T+ΔT) can be indicated simultaneously.

In the image information overlapped at step S1403, portions exhibiting large differences are detected as moving objects (step S1404). Specifically, the animal 1502 (or the animal 1602) and the person 1503 (or the person 1602) are detected as moving objects. Attribute points are extracted in the moving object area (step S1405) to acquire a template near the attribute points (step S1406). The template acquired at step S1406 is matched with the image information for time (T+ΔT) to calculate a motion vector M (step S1407). Specifically, for example, a motion vector M1 and a motion vector M2 depicted in FIG. 18 are calculated.

Figure 18:
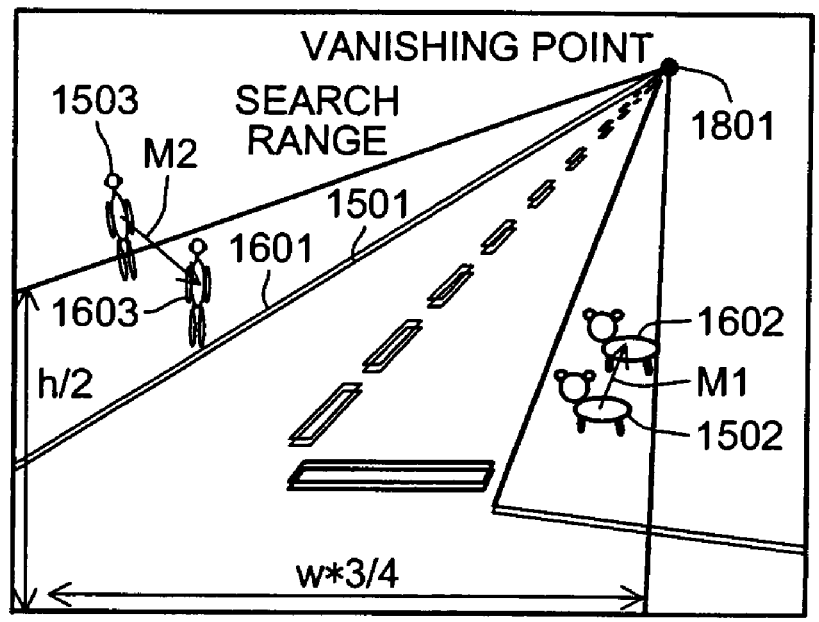
FIG. 18 is an explanatory diagram of a motion vector M.

FIG. 18 is an explanatory diagram of the motion vector M. FIG. 18 depicts the road 1501, 1602, the animal 1502, 1602, the person 1503, 1603, and a vanishing point 1801. The motion vectors M depicted in FIG. 18 indicate distances and directions of movement during ΔT. Therefore, M1 is the motion vector when the animal 1502 moves to the position of the animal 1602 during ΔT and M2 is the motion vector when the person 1503 moves to the position of the person 1603 during ΔT.

A danger index D is calculated from the motion vector M calculated at step S1407 and vehicle speed V (step S1408). The danger index D is calculated with the use of a unit vector I having the attention point as the start point and the end point direction toward the vanishing point 1801 of the road, the motion vector M, and the vehicle speed V. Specifically, the danger index D is calculated from a product of an absolute value of an inner product of the motion vector M and the unit vector I and the vehicle speed V. Assuming that a width of the road after the turn is L, $D=|I \cdot M| \times V/(L/4)$ may be obtained. If the direction of the motion vector M is perpendicular to the unit vector I, the danger index D is calculated to be greater and if the direction of the motion vector M is parallel to the unit vector I, the danger index D is calculated to be smaller.

Figure 19:
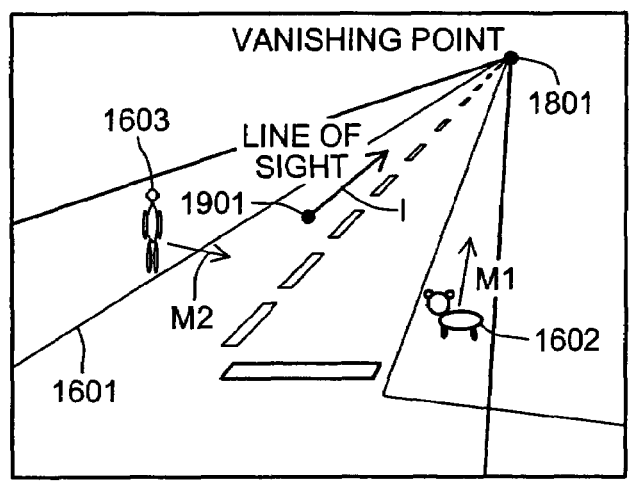
FIG. 19 is an explanatory diagram of degrees of the danger index D depending on the relationship between a unit vector I and the motion vector M.

FIG. 19 is an explanatory diagram of degrees of the danger index D depending on the relationship between the unit vector I and the motion vector M. FIG. 19 depicts the road 1601, the animal 1602, the person 1603, the motion vector M1 of the animal, the motion vector M2 of the person, the vanishing point 1801, the attention point 1901, and the unit vector I. Since the motion vector M2 of the person is perpendicular to the unit vector I as depicted in FIG. 19, the danger index D becomes larger. Since the motion vector M1 of the animal is parallel to the unit vector I, the danger index D becomes smaller. The danger index D calculated at step S1408 is stored (step S1409), and a series of the processing ends.
(Processing for Calculating the Second Attention Point)

Figure 20:
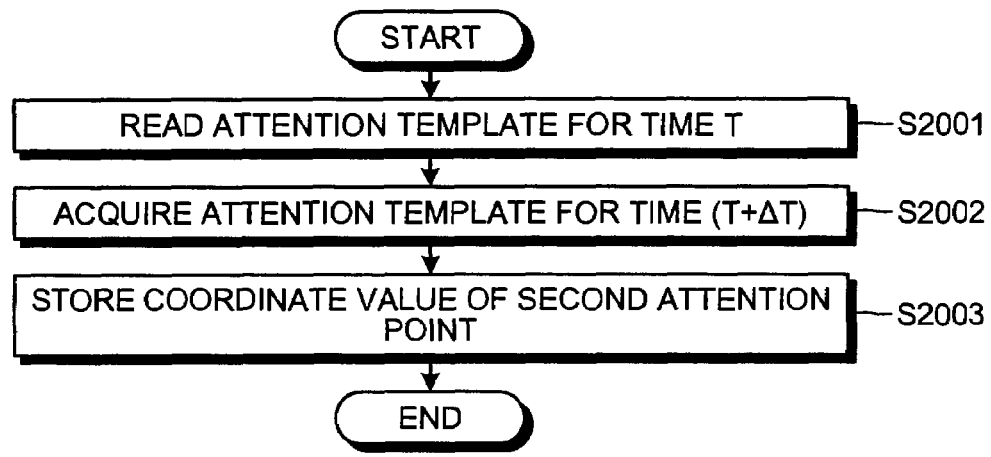
FIG. 20 is a flowchart of processing for calculating a second attention point.

The processing for calculating the second attention point at step S510 of FIG. 5 will be described in detail with reference to FIG. 20. FIG. 20 is a flowchart of the processing for calculating the second attention point. As depicted in FIG. 20, the attention-point template for time T acquired at step S1302 of FIG. 13 is read out (step S2001).

The image information for time (T+ΔT) stored at step S1305 of FIG. 13 is read, and the image information for time (T+ΔT) is matched with the attention-point template for time T to acquire the attention-point template for time (T+ΔT) (step S2002). The center coordinates of the attention-point template for time (T+ΔT) acquired at step S2202 are defined as the second attention point and the coordinate value of the second attention point is stored in the storage unit 403 (step S2003), and a series of the processing ends.
(Processing for Determining whether Danger Index is at Least Equal to Threshold Values)

Detailed description will be made of the processing for determining whether the danger index is at least equal to the threshold values at step S511 and step S512 of FIG. 5. For example, if the motion vector M has a component perpendicular to the unit vector I and if the length of the discontinuity of the road edge is L, $|I \cdot M|/(L/4)=1$ is satisfied. Therefore, the danger index D=V is obtained and the vehicle speed V at the turn is defined as the danger index D. Specifically, assuming that a slow speed is 20 km/h, it is determined that the danger index D is high if the danger index D is equal to or more than 20.

Assuming that the threshold value A at step S511 of FIG. 5 is 20 and that the threshold value B at step S512 is 40, if the danger index D is less than 20, the processing returns to step S505 without warning the driver and the control signal is calculated. If the danger index D is equal to or more than 20 and less than 40, the processing proceeds to step S515 to warn the driver and returns to step S505 and the control signal is calculated. If the danger index D is equal to or more than 40, the processing proceeds to step S531 without warning the driver and the recovery of normal vehicular operation is waited for.
(Processing for Determining whether Recovery of Normal Vehicular Operation has been Achieved)

Figure 21:
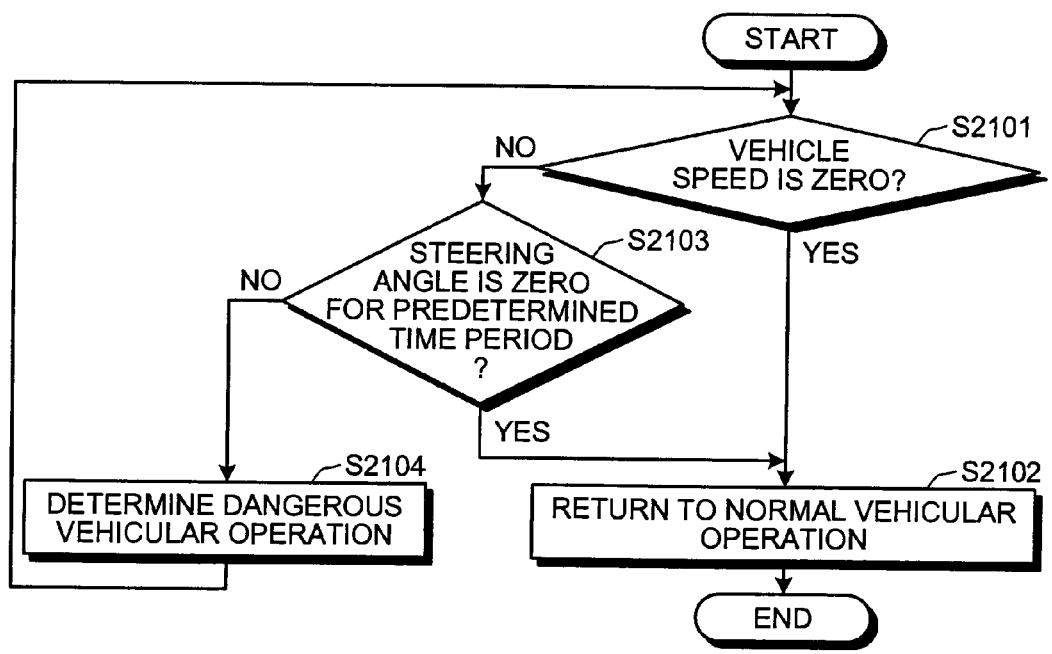
FIG. 21 is a flowchart of processing for determining whether recovery of normal vehicular operation has been achieved.

The processing at step S513 of FIG. 5 for determining whether the recovery of normal vehicular operation has been achieved will be described in detail with reference to FIG. 21. FIG. 21 is a flowchart of the processing for determining whether the recovery of normal vehicular operation has been achieved. As depicted in FIG. 21, it is determined whether the vehicle speed is zero (step S2101). If the vehicle speed is zero at step S2101 (step S2101: YES), it is determined that recovery of normal vehicular operation has been achieved (step S2102), and a series of the processing ends.

If the vehicle speed is not zero at step S2101 (step S2101: NO), it is determined whether the steering angle is zero for at least a certain time period (step S2103). If the steering angle is zero for a certain time period or more at step S2103 (step S2103: YES), the processing proceeds to step S2102 determining that recovery of normal vehicular operation has been achieved, and a series of the processing ends. If the steering angle is not zero for a certain time period or more at step S2103 (step S2103: NO), dangerous vehicular operation is determined (step S2104), the processing returns to step S2101 and subsequent processes are repeated.
(Processing for Warning Driver)

The processing for warning the driver at step S515 of FIG. 5 will be described in detail. If dangerous vehicular operation is determined at step S2104 of FIG. 21, the drive control apparatus 400 warns the driver. The warning to the driver is given by images or sounds output from the information output unit 405 or the motion of the driving unit 401, for example.

Alternatively, the warning of the dangerous vehicular operation is given to the driver through a combination thereof.

Although the processing returns to step S505 if the danger index is less than the threshold value A at step S511: NO of FIG. 5 and the processing proceeds to step S515 to warn the driver and returns to step S505 if the danger index is less than the threshold value B at step S512: NO in this example, configuration is not limited hereto. Specifically, for example, the driving unit 401 is controlled to continue tracking the moving objects. The driving index may specially be calculated for these moving objects to further avoid danger.

Although the danger index is calculated from the relationship of positions of objects with the use of the image information in this example, configuration is limited hereto. For example, the danger index may be a value greater than that of the normal vehicular operation when turning right or left, changing lanes, watching road signs/billboards, passing areas having a high incidence of accidents, traveling on a narrow road, passing interchange points of express ways, etc.

Specifically, when turning right or left, the danger index is calculated from the turn indicator information. When turning left, the turning to the left is detected from the turn indicator information and the danger index is set to a value larger than that of normal vehicular operation. In the case of left-hand traffic, the danger index is set to a larger value when turning right than turning left since the opposite lane is traversed. Therefore, when turning right, the turning to the right is detected from the turn indicator information and the danger index is set to a value larger than that of the time of turning left.

When watching road signs/billboards, passing areas having a high incidence of accidents, passing interchange points of express ways, etc., the map information is used to calculate the danger index. For example, if the current position of the vehicle on the map information comes close to school zones, important road signs/billboards on the route to the destination, accident-prone areas, interchange points of express ways, etc., the danger index is set to a value larger than that of normal vehicular operation.

Similarly, when changing lanes, traveling on a narrow road, etc., the danger index is calculated from the road conditions and information concerning other vehicles. For example, the vehicle information I/F 406, the external device I/F 407, and the image sensor unit 411 are used to calculate a width of the road and detect a lane change, and the danger index is set larger than that of normal vehicular operation if the vehicle travels on a narrow road or changes lanes.

In other cases of calculating the danger index depending on external situations, the sound sensor unit 415 acquires sounds to determine whether the driving condition is highly stressful and the danger index is set larger than that of normal vehicular operation, for example, when a horn is blown outside. Another example of calculating the danger index depending on external circumstances is that the danger index may be set larger than that of normal vehicular operation when it rains heavily based on a determination made according to weather information acquired from a portable terminal through the external device I/F 407, image processing by the image sensor unit 411, the sound of rain acquired by the sound sensor unit 415, etc.

The danger index may be calculated from a change in the state of the driver. For example, if it is determined that the driver feels sleepy from the information acquired from the image sensor unit 411, the acceleration sensor unit 413, the biological sensor 427, etc., the danger index is set larger than that of normal vehicular operation. The threshold value A and the threshold value B of the step S511 and step S512 of FIG. 5 may be set to smaller values. The shooting direction of the image sensor unit 411 may be turn toward the driver depending on determined a degree of sleepiness. The state of the driver may be determined in detail from captured image information to calculate the danger index.

Specifically, when calculating the danger index from a change in the state of the driver, the image information outside the vehicle captured by the image sensor unit 411 is used to determine whether the vehicle deviates from the lane, and if is determined that the deviation is dangerous, the danger index is set larger than that of normal vehicular operation. The image information inside the vehicle captured by the image sensor unit 411 may be used to detect the number and lengths of eye blinks by the driver and the danger index may be set larger than that of normal vehicular operation depending on the detection result.

Specifically, when calculating the danger index from a change in the state of the driver, vibrations of the vehicle may be detected with the acceleration sensor unit 413 and the sleepiness of the driver may be detected from the vibrations of the vehicle to set the danger index larger than that of normal vehicular operation. Specifically, when calculating the danger index from a change in the state of the driver, the heart rate, brain waves, respiration, etc., of the driver may be detected with the biological sensor 427 and if it is determined that the driver feels sleepy, is under high stress, or is excessively tense, the danger index may be set larger than that of normal vehicular operation.

The danger index may be calculated according to the information concerning the vehicle acquired by the vehicle information I/F 406. Specifically, for example, if the turn indicator or wiper is operated, the danger index is set larger than that of normal vehicular operation. If the hazard lamp is turned on or if the headlights are turned on, the danger index is set larger than that of normal vehicular operation. If the vehicle speed is greater than the speed limit defined in the map information or recognized from the road signs/billboards, the danger index may be set larger than that of normal vehicular operation, and if a difference in the steering angle is equal to a predetermined value or more as compared to the map information, the danger index may be set larger than that of normal vehicular operation.

The danger index may be set larger than that of normal vehicular operation depending on the distance to the preceding vehicle. For example, the distance to the preceding vehicle is acquired by sensors that acquire the distance to an object such as the image sensor unit 411, the ultrasonic sensor unit 421, the infrared sensor unit 424, etc., and if the distance to the preceding vehicle is less than a predetermined distance or if the relative speed to the preceding vehicle is a predetermined value or more, the danger index may be set larger than that of normal vehicular operation. If the image sensor unit 411, etc., recognizes that the hazard lamp of the preceding vehicle is turned on, the danger index may be set larger than that of normal vehicular operation.

As described above, according to the navigation apparatus 300 or the drive control apparatus 400 of the example, the calculating unit 103 calculates a danger index indicative of the possibility of occurrence of a dangerous event for the mobile body based on the information concerning the mobile body acquired by the information acquiring unit 101, and the control unit 106 can control the driving unit 102 that drives the sensor mounted on the mobile body based on the calculation result calculated. Therefore, the driving unit 102 can be controlled if it is determined that a dangerous event will occur for the mobile body even when a user does not watch the driving unit 102, for example. This enables the driving unit 102 to be controlled and prevented from interfering with the judgment of the user while operating the vehicle under dangerous circumstances.

According to the navigation apparatus 300 or the drive control apparatus 400 of the example, a passenger of the mobile body can be notified of the possibility of occurrence of a dangerous event for the mobile body based on the calculation result calculated by the calculating unit 103. Therefore, the navigation apparatus 300 or the drive control apparatus 400 can give a warning of dangerous vehicular operation to a driver if the danger index is within a predetermined range. This enables a user to know that circumstances are dangerous and to avoid a dangerous event such as an accident.

According to the navigation apparatus 300 or the drive control apparatus 400 of the example, the control unit 106 can stop the drive of the driving unit 102 if the determining unit 105 determines that the danger index is a value greater than a predetermined value. Therefore, the navigation apparatus 300 or the drive control apparatus 400 can stop the driving unit 102 within the visual field of the driver during dangerous circumstances to prevent the driving unit 102 from being mistaken for an object outside the vehicle (such as a person or an oncoming vehicle). This enables a user to concentrate on operating the vehicle since no distractive motion exists within the visual field.

According to the navigation apparatus 300 or the drive control apparatus 400 of the example, the driving unit 102 can drive the information acquiring unit 101. Therefore, a wide range of information can be acquired by driving the information acquiring unit 101 by the driving unit 102. This enables a user to extensively detect the possibility of occurrence of a dangerous event.

According to the navigation apparatus 300 or the drive control apparatus 400 of the example, the information acquiring unit 101 can acquire image information concerning the surroundings of the mobile body. Therefore, an object with a higher danger index for the mobile body may be identified from changes in the acquired image information. This enables a user to avoid a dangerous event such as an accident.

According to the navigation apparatus 300 or the drive control apparatus 400 of the example, the drive of the driving unit 102 can be resumed if the determining unit 105 determines that the danger index returns to a value smaller than the predetermined value. Therefore, the driving unit 102 may be driven during normal vehicular operation. This enables a user to resume the motion of a robot, etc., mounted on the vehicle after a dangerous event has been avoided even if the motion was terminated.

According to the navigation apparatus 300 or the drive control apparatus 400 of the example, the driving unit 102 can drive a sensor mounted on the mobile body in the yaw direction and the pitch direction. Therefore, the drive control apparatus 100 can extensively detect information concerning the mobile body. This enables a user to extensively detect the possibility of occurrence of a dangerous event.

As described above, according to the drive control apparatus, the drive control method, the drive control program, and the recording medium of the present invention, the navigation apparatus 300 or the drive control apparatus 400 can calculate the danger index based on the information acquired by various sensors included in the sensor unit 410 and can control the driving unit 102 if the danger index is equal to the threshold value or more. Therefore, the driving unit 401 can be terminated at the time of dangerous vehicular operation even when the driver does not watch at the driving unit 401. This enables the driver to concentrate on operating the vehicle since no distractive motion exists within the visual field.

The drive control method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A drive control apparatus comprising:
a driving unit that presents information to a passenger in a mobile body, wherein the driving unit drives a sensor mounted on the mobile body;
an information acquiring unit that acquires information concerning the mobile body;
a calculating unit that, based on the information acquired by the information acquiring unit, calculates a danger index indicative of a possibility of occurrence of a dangerous event for the mobile body;
a determining unit that determines whether the danger index calculated by the calculating unit is greater than a given value; and
a control unit that controls the driving unit based on a calculation result calculated by the calculating unit, wherein
the control unit terminates driving of the sensor by the driving unit when the determining unit determines the danger index to be greater than the given value.

2. The drive control apparatus according to claim 1, further comprising a notifying unit that notifies the passenger of the possibility of occurrence of a dangerous event for the mobile body, based on the calculation result calculated by the calculating unit.

3. The drive control apparatus according to claim 1, wherein the driving unit drives the information acquiring unit.

4. The drive control apparatus according to claim 1, wherein the information acquiring unit acquires image information indicative of surroundings of the mobile body.

5. The drive control apparatus according to claim 1, wherein the control unit resumes the driving of the sensor by the driving unit when the determining unit determines that the danger index has returned to a value less than the given value.

6. The drive control apparatus according to claim 1, wherein the driving unit drives, in a yaw direction and a pitch direction, the sensor mounted on the mobile body.

7. A drive control method comprising:
driving a sensor mounted on a mobile body;
acquiring information concerning the mobile body;
calculating, based on the information acquired at the acquiring, a danger index indicative of a possibility of occurrence of a dangerous event for the mobile body;
determining whether the danger index calculated at the calculating is greater than a given value; and
controlling, based on a calculation result calculated at the calculating, a driving unit that presents information to a passenger on the mobile body, wherein
the controlling further includes terminating driving of the sensor by the driving unit when at the determining, the danger index is determined to be greater than the given value.

8. A computer-readable recording medium storing therein a driving control program that causes a computer to execute:
driving a sensor mounted on a mobile body;
acquiring information concerning the mobile body;

calculating, based on the information acquired at the acquiring, a danger index indicative of a possibility of occurrence of a dangerous event for the mobile body;
determining whether the danger index calculated at the calculating is greater than a given value; and
controlling, based on a calculation result calculated at the calculating, a driving unit that presents information to a passenger on the mobile body, wherein the controlling further includes terminating driving of the sensor by the driving unit when at the determining, the danger index is determined to be greater than the given value.

* * * * *